United States Patent
Zhu et al.

(10) Patent No.: US 10,209,462 B2
(45) Date of Patent: Feb. 19, 2019

(54) QSFP+ MODULE HOT-PLUGGABLE UNLOCKING STRUCTURE

(71) Applicant: O-NET COMMUNICATIONS (SHENZHEN) LIMITED, Shenzhen, Guangdong (CN)

(72) Inventors: Peiwen Zhu, Guangdong (CN); Zhaofeng Zeng, Guangdong (CN)

(73) Assignee: O-NET COMMUNICATIONS (SHENZHEN) LIMITED, Shenzhen (CN)

( * ) Notice: Subject to any disclaimer, the term of this patent is extended or adjusted under 35 U.S.C. 154(b) by 0 days.

(21) Appl. No.: 15/694,886

(22) Filed: Sep. 4, 2017

(65) Prior Publication Data
US 2017/0363828 A1 Dec. 21, 2017

Related U.S. Application Data

(63) Continuation of application No. PCT/CN2015/085072, filed on Jul. 24, 2015.

(30) Foreign Application Priority Data

Jun. 9, 2015 (CN) .................. 2015 2 0393482 U

(51) Int. Cl.
*G02B 6/42* (2006.01)
*H01R 13/627* (2006.01)
(Continued)

(52) U.S. Cl.
CPC ............. *G02B 6/42* (2013.01); *G02B 6/3893* (2013.01); *G02B 6/4284* (2013.01);
(Continued)

(58) Field of Classification Search
CPC ................ H01R 13/627; H01R 13/633; H01R 13/6271–13/6275; H01R 13/62933; G02B 6/4284
(Continued)

(56) References Cited

U.S. PATENT DOCUMENTS

| 5,915,987 | A * | 6/1999 | Reed ................. H01R 13/6275 439/258 |
| 7,699,641 | B2 * | 4/2010 | Bright ................ H01R 13/6275 439/352 |

(Continued)

FOREIGN PATENT DOCUMENTS

| CN | 201464679 | * | 5/2010 | ............... G02B 6/42 |
| CN | 203218595 | U | 9/2013 | |

OTHER PUBLICATIONS

International Search Report of PCT Patent Application No. PCT/CN2015/085072 dated Mar. 7, 2016.

*Primary Examiner* — Robert Tavlykaev

(57) ABSTRACT

The present utility model relates to the field of a QSFP+ module hot-pluggable unlocking structure. The hot-pluggable unlocking structure includes a housing formed of an upper cover and a lower cover buckled to each other, and a locking component provided on the housing, where guiding grooves are provided on two sides of the housing, two unlocking pieces are provided at one end of the locking component and a pull tab is provided at the other end, the unlocking pieces are engaged with and provided in the guiding grooves, a spring is provided on the upper cover, spring-catch elements are provided on the locking component and protrude towards the upper cover, and the spring-catch elements and the spring are pressed against each other. The structure simplifies the pull tab unlocking structure and manufacturing process thereof and helps reduce costs.

3 Claims, 14 Drawing Sheets

(51) Int. Cl.
*G02B 6/38* (2006.01)
*G02B 6/00* (2006.01)

(52) U.S. Cl.
CPC ....... *H01R 13/627* (2013.01); *H01R 13/6275* (2013.01); *G02B 6/00* (2013.01)

(58) Field of Classification Search
USPC ........ 385/76, 77, 88, 92; 439/133, 304, 345, 439/346, 350, 352, 353, 354, 357, 358, 439/370; 398/139, 200, 201, 212, 214
See application file for complete search history.

(56) References Cited

U.S. PATENT DOCUMENTS

| | | | |
|---|---|---|---|
| 9,472,898 B2 * | 10/2016 | Yang ................... | H01R 13/6395 |
| 2014/0134898 A1 * | 5/2014 | Wang ................. | H01R 13/6275 439/843 |
| 2017/0205591 A1 * | 7/2017 | Takano ................ | G02B 6/3893 |

* cited by examiner

QSFP+ MODULE HOT-PLUGGABLE UNLOCKING STRUCTURE

CROSS REFERENCE TO RELATED APPLICATIONS

The present application is a Continuation Application of PCT application No. PCT/CN2015/085072 filed on Jul. 24, 2015, which claims the benefit of Chinese Patent Application No. 201520393482.1 filed on Jun. 9, 2015. All the above are hereby incorporated by reference.

TECHNICAL FIELD

The present utility model relates to the field of optoelectronic communications transmission technologies, and in particular, to a QSFP+ module hot-pluggable unlocking mechanism.

BACKGROUND

As a large-scale data center imposes increasingly high requirements on a data transmission speed, a transmission speed of connectors of related supporting optical modules is correspondingly improved; as a result, various 4×28G quad small form-factor pluggable optical transceiver modules emerge. One manner is to separate a cable from a module by using an MTP connector, and this manner is applied to 28G Quad Small Form-factor Pluggable Plus (QSFP+) Short Reach Lane 4 (SR4) modules and 28G QSFP+ Parallel Single Mode Lane 4 (PSM4) modules.

At present, a hot-pluggable unlocking structure is widely used in the QSFP+ modules. However, the existing hot-pluggable unlocking structure has a complex structure and features a complex manufacturing process and high costs.

SUMMARY

A technical issue to be resolved by the present utility model is to provide a QSFP+ module hot-pluggable unlocking mechanism, to avoid the foregoing prior-art disadvantages. This overcomes drawbacks of a complex structure and manufacturing process of the existing hot-pluggable unlocking mechanism, and reduce costs.

The technical solution used in the present utility model to resolve the technical issue is to provide a QSFP+ module hot-pluggable unlocking mechanism, including a housing formed of an upper cover and a lower cover buckled to each other, and a locking component provided on the housing, where guiding grooves are provided on two sides of the housing, two unlocking pieces are provided at one end of the locking component and the other end thereof is provided with a pull tab, the unlocking pieces are engaged with and provided in the guiding grooves, a spring is provided on the upper cover, spring-catch elements are provided on the locking component and protrude towards the upper cover, and the spring-catch elements and the spring are pressed against each other.

In a further preferred embodiment of the present utility model, the upper cover is provided with a spring groove, a middle portion of the spring groove is provided with a positioning pin, the spring is a torsion spring with a helical center hole, and the torsion spring is sheathed on the positioning pin.

In a further preferred embodiment of the present utility model, spring-catch guide are further provided in the spring groove, and bottoms of the spring-catch elements are located in the spring-catch guide.

In a further preferred embodiment of the present utility model, spacing grooves are further provided on the two sides of the housing, the spacing grooves are connected to the guiding grooves, spacing projections are provided on the sides of the unlocking pieces, and the spacing projections are engaged with and provided in the spacing grooves.

In a further preferred embodiment of the present utility model, unlocking projections are provided at the ends of the unlocking pieces.

In a further preferred embodiment of the present utility model, a pull-tab sleeve is provided around the pull tab, the pull tab is enclosed in the pull-tab sleeve, and a streamlined curved surface is disposed at the rear end of the pull-tab sleeve.

A beneficial effect of the present utility model lies in that: the housing is formed of the upper cover and the lower cover buckled to each other, the locking component is provided on the housing, the spring is provided on the upper cover, the spring-catch elements are provided on the locking component and protrude towards the upper cover, and the spring-catch elements and the spring are pressed against each other; in addition, the guiding grooves are provided on the two sides of the housing, two unlocking pieces are provided at one end of the locking component and the pull tab is provided at the other end, and the unlocking pieces are engaged with and provided in the guiding grooves; therefore, the structure simplifies the pull tab unlocking structure and manufacturing process thereof and helps reduce costs.

BRIEF DESCRIPTION OF DRAWINGS

The present utility model is further described with reference to the embodiments and the accompany drawings in which.

DESCRIPTION OF EMBODIMENTS

Herein, exemplary embodiments of the present utility model are described in detail with reference to the accompanying drawings. A QSFP+ module hot-pluggable unlocking structure conforms to the MSA protocol.

Figure 1:
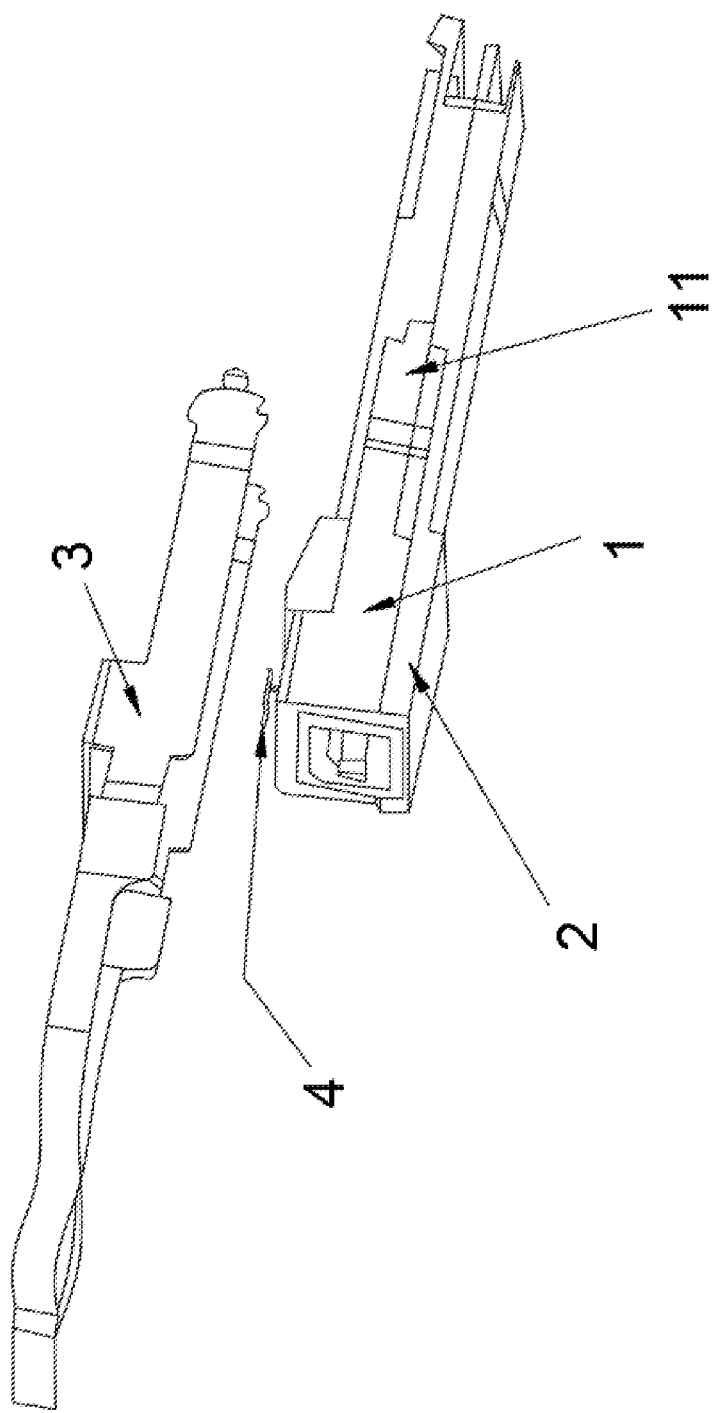
FIG. 1 is a schematic assembly diagram of a QSFP+ module hot-pluggable unlocking structure according to the present utility model.
Figure 2:
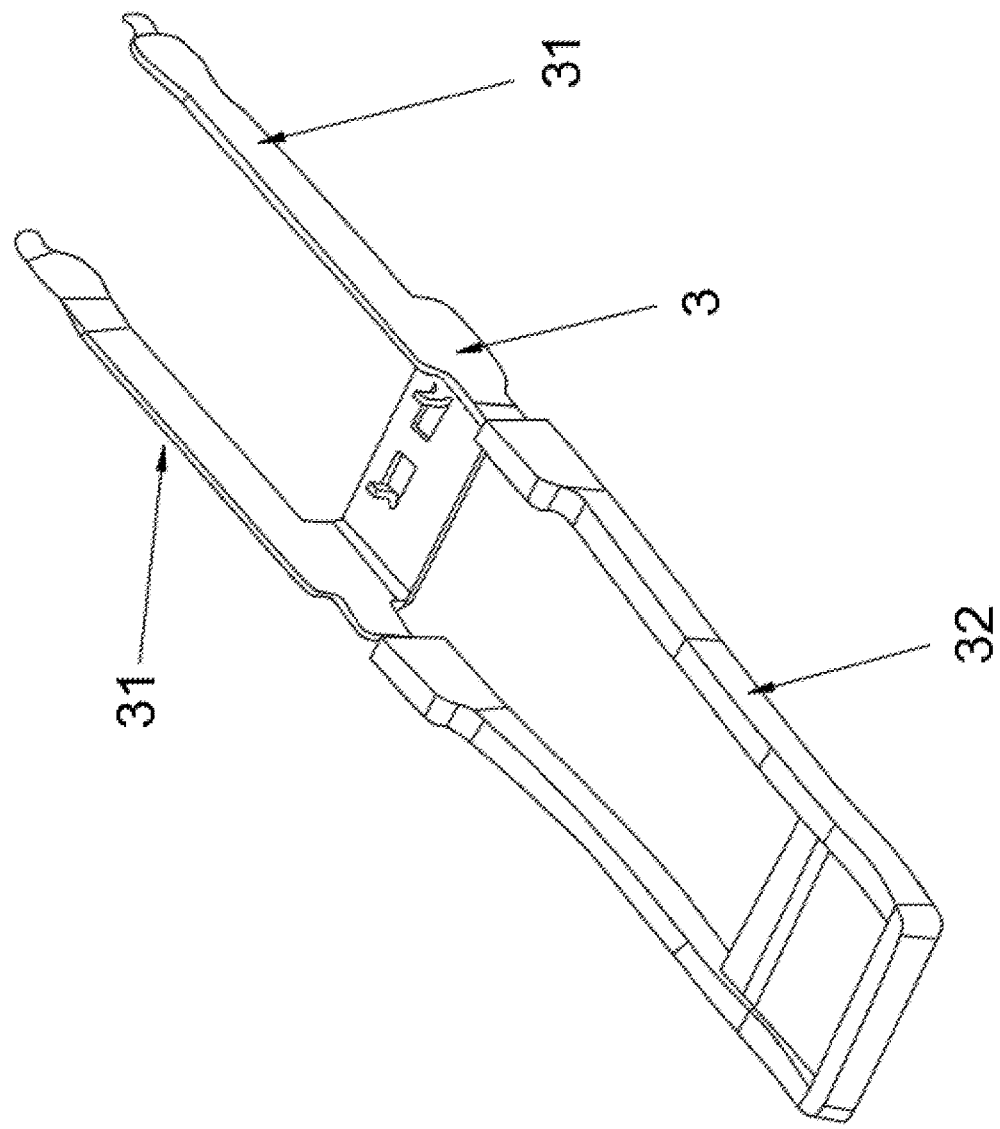
FIG. 2 is a schematic diagram of an overall structure of a locking component, a pull tab, and unlocking pieces according to the present utility model.
Figure 3:
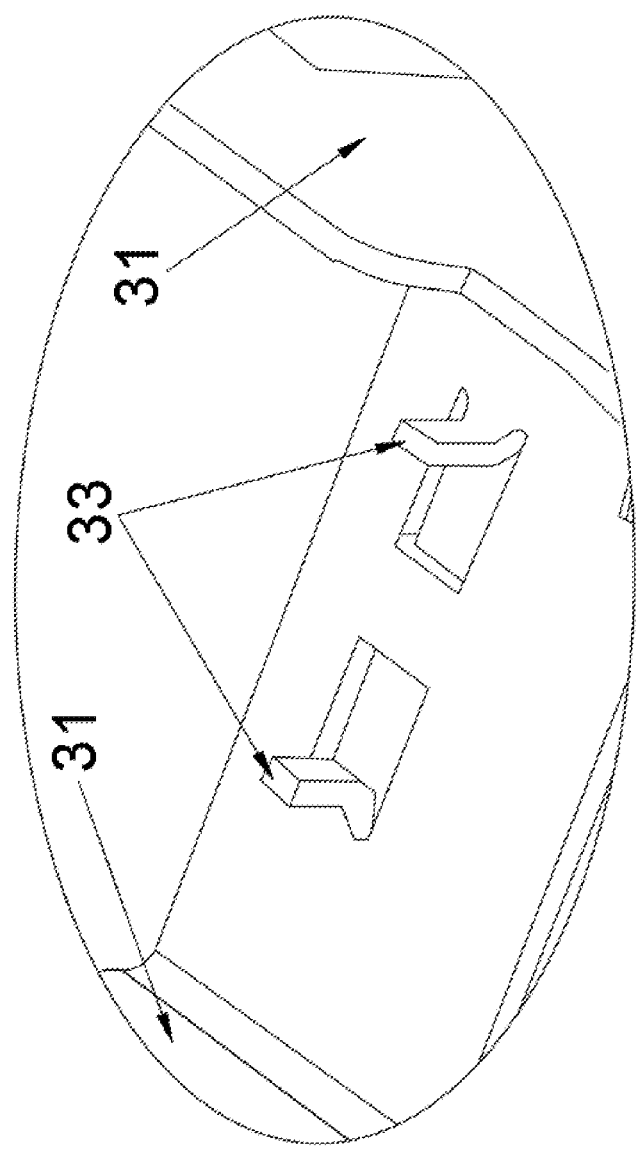
FIG. 3 is a partially enlarged schematic diagram of spring-catch elements on a locking component according to the present utility model.
Figure 4:
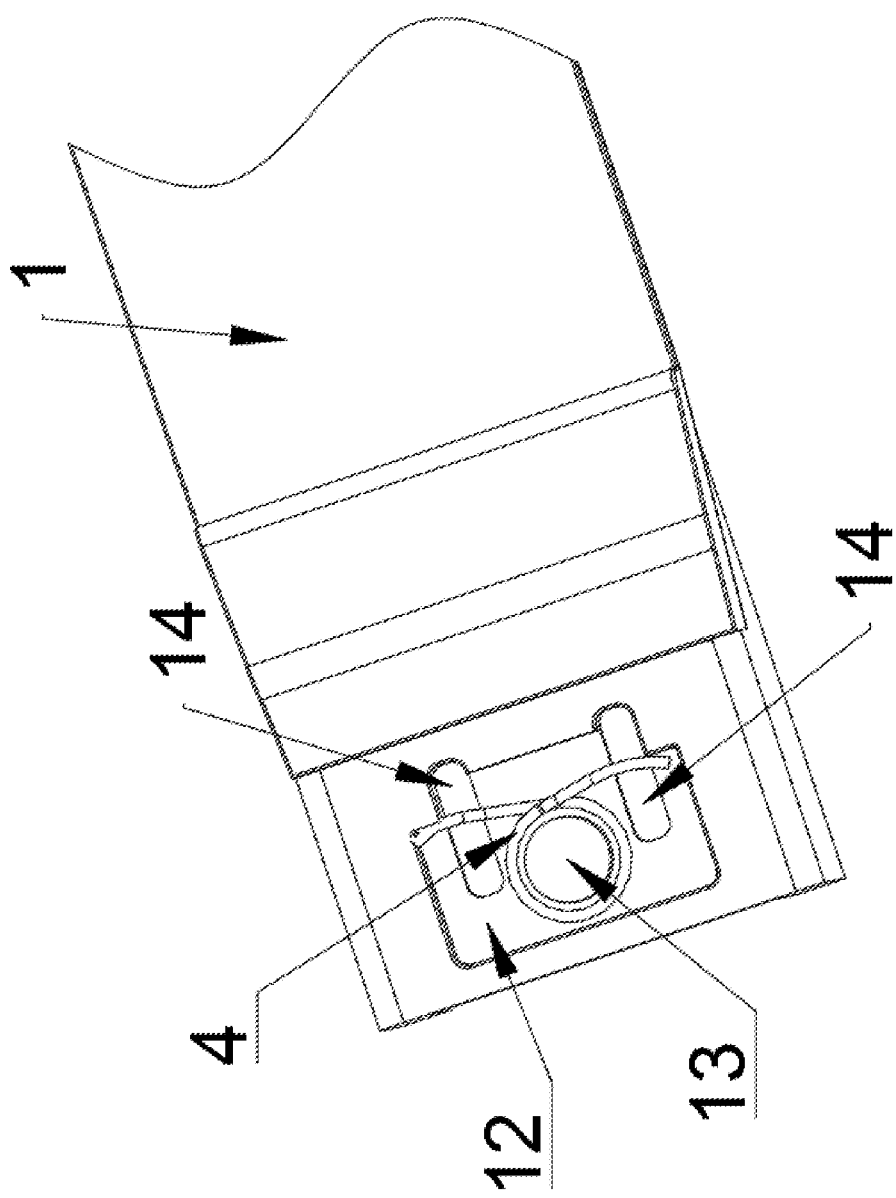
FIG. 4 is a partially enlarged schematic diagram of a spring groove on an upper cover according to the present utility model.
Figure 5:
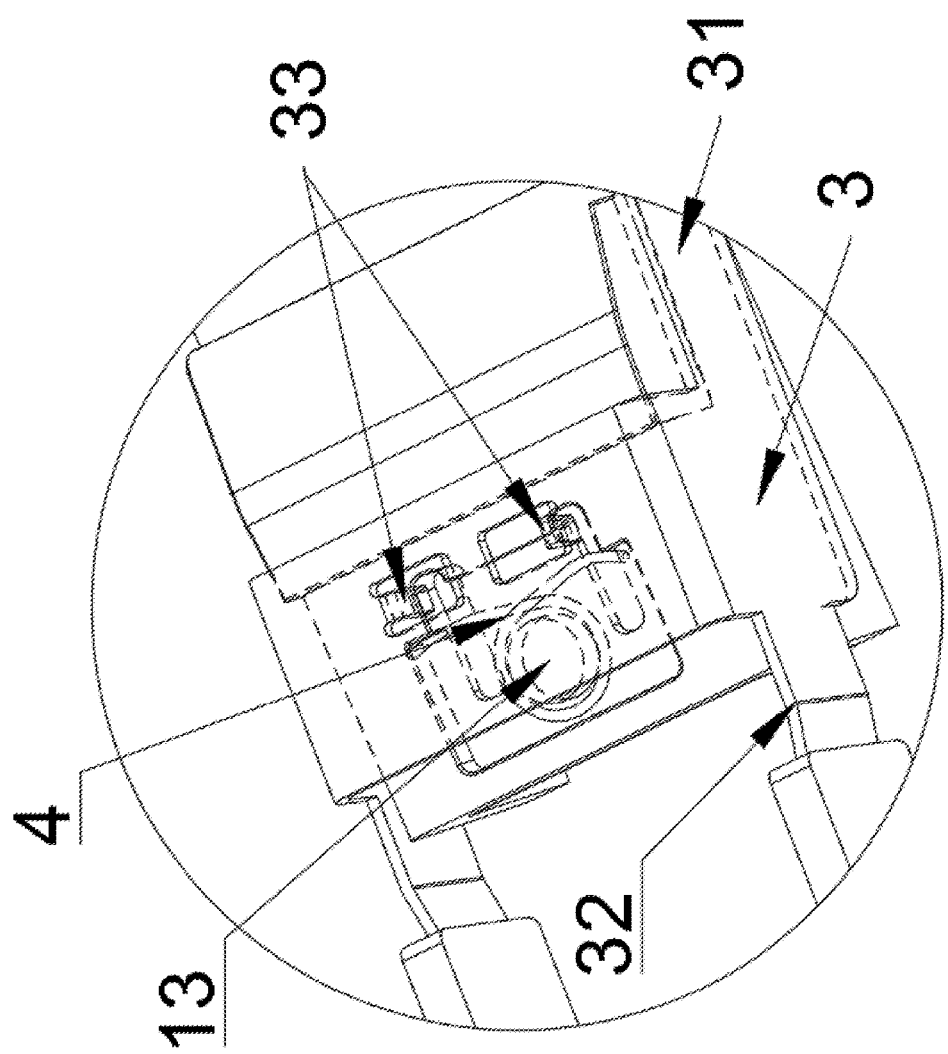
FIG. 5 is a partial perspective view of positions at which spring-catch elements and a torsion spring are pressed against each other according to the present utility model.
Figure 11:
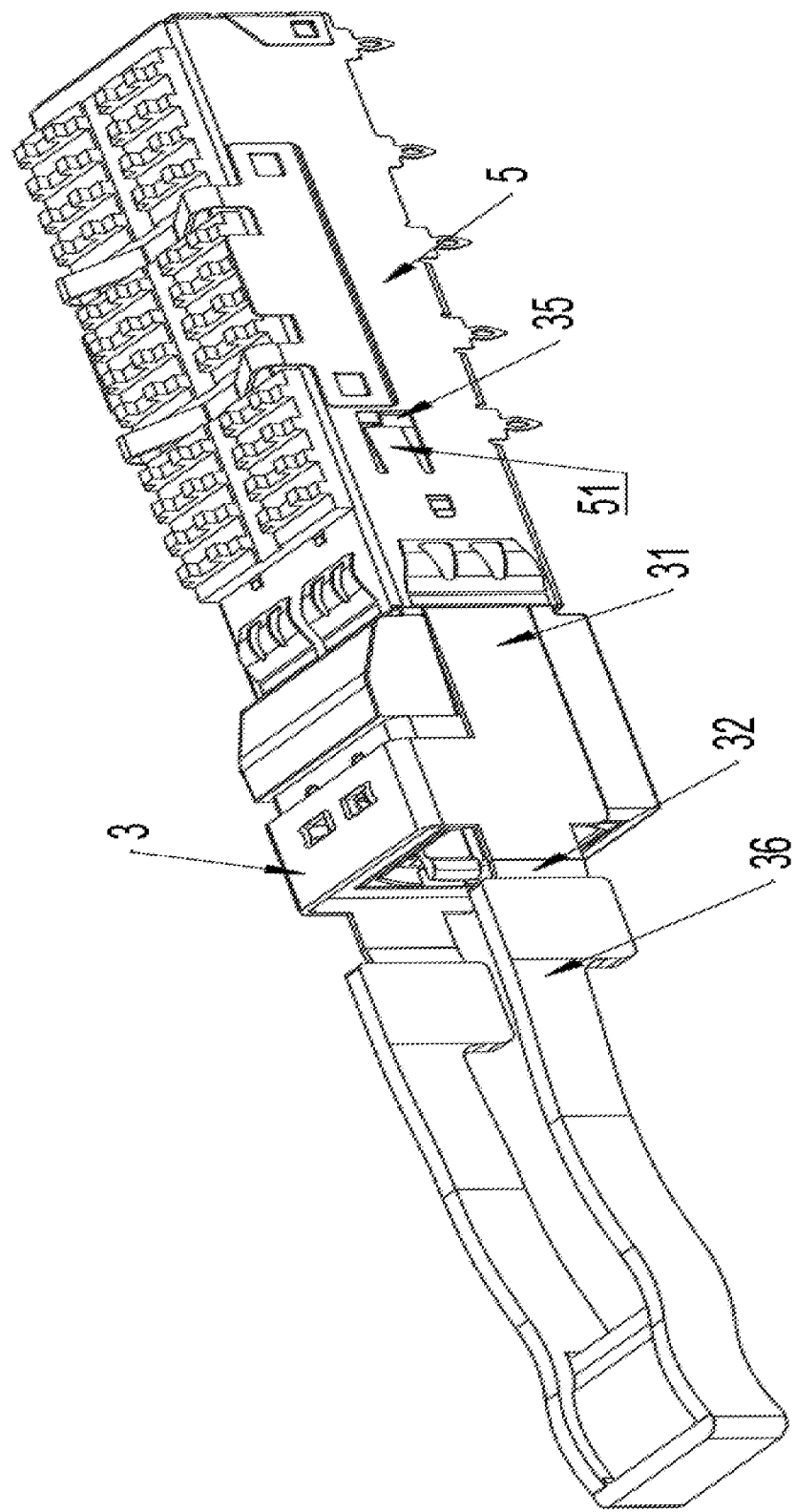
FIG. 11 is a schematic 3D structural diagram of a QSFP+ module hot-pluggable unlocking structure that is locked in a cage receptacle according to the present utility model.

As shown in FIG. 1 to FIG. 5, and FIG. 11, a QSFP+ module hot-pluggable unlocking structure includes a housing formed of an upper cover 1 and a lower cover 2 buckled to each other, and a locking component 3 provided on the housing, where guiding grooves 11 are provided on two sides of the housing, one end of the locking component 3 is provided with two unlocking pieces 31 and the other end thereof is provided with a pull tab 32, and the unlocking pieces 31 are engaged with and provided in the guiding grooves 11; where a spring 4 is provided on the upper cover 1, spring-catch elements 33 are provided on the locking component 3 and protrude towards the upper cover 1, and the spring-catch elements 33 and the spring 4 are pressed against each other. According to the structure, the housing is formed of the upper cover 1 and the lower cover 2 buckled to each other, the locking component 3 is provided on the housing, the spring 4 is provided on the upper cover 1, the spring-catch elements 33 are provided on the locking component 3 and protrude towards the upper cover 1, and the spring-catch elements 33 and the spring 4 are pressed against each other; the guiding grooves 11 are provided on the two sides of the housing, the two unlocking pieces 31 are provided at one end of the locking component 3 and the pull tab 32 is provided at the other end, and the unlocking pieces 31 are engaged with and provided in the guiding grooves 11; therefore, the structure simplifies a pull-tab unlocking structure and manufacturing process thereof and helps reduce costs. Preferably, the locking component 3 is made in one piece with the unlocking pieces 31 and the pull tab 32. Further, the upper cover 1 is provided with a spring groove 12, a middle portion of the spring groove 12 is provided with a positioning pin 13, the spring 4 is a torsion spring with a helical center hole, and the torsion spring is sheathed on the positioning pin 13. Using the torsion spring with a helical center hole reduces costs and simplifies an assembly procedure. Preferably, the spring groove 12 includes a wide portion and a narrow portion, where two transition steps are formed on both sides at a joint between the wide portion and the narrow portion form, and the positioning pin 13 is provided in the wide portion. During assembly, the torsion spring is first sheathed on the positioning pin 13 and then two legs of the torsion spring are respectively abutted against the corresponding transition steps, so that the torsion spring is in a preloaded state. The locking component 3 is then inserted into the upper cover 1, and the spring-catch elements 33 further press the two legs of the torsion spring, so that the elastic stress generated by the torsion spring causes the locking component 3 to remain in an initial assembly position in a scenario without external pulling force. Finally, all internal parts of the QSFP+ module are installed between the upper cover 1 and the lower cover 2, and the upper cover 1 and the lower cover 2 are fastened by using screws. By pulling the pull tab 32, a user can unlock and remove the QSFP+ module from a cage receptacle 5.

The hot-pluggable unlocking structure in this embodiment may be generally applied to QSFP+ modules with different optical interfaces. With this structure, application compatibility is improved because the structure can not only be applied to QSFP+ modules connected to MPO and MTP optical ports, but also be compatible with QSFP+ modules with other optical ports, for example, AOC and LC receptacle interface modules. This greatly saves mold costs for initial development and subsequent manufacturing costs. Further, in order to meet design requirements of different types of QSFP+ modules, the upper cover 1 and the lower cover 2 are fastened with countersunk screws and are assembled in a vertical direction by placing the upper cover 1 on the lower cover 2, not requiring other assembly operations in another direction. This meets different internal sizes of QSFP+ modules with different circuits and optical designs to a greatest extent, and avoids damages to internal parts caused by internal interference during assembly due to different circuits and optical designs.

Figure 6:
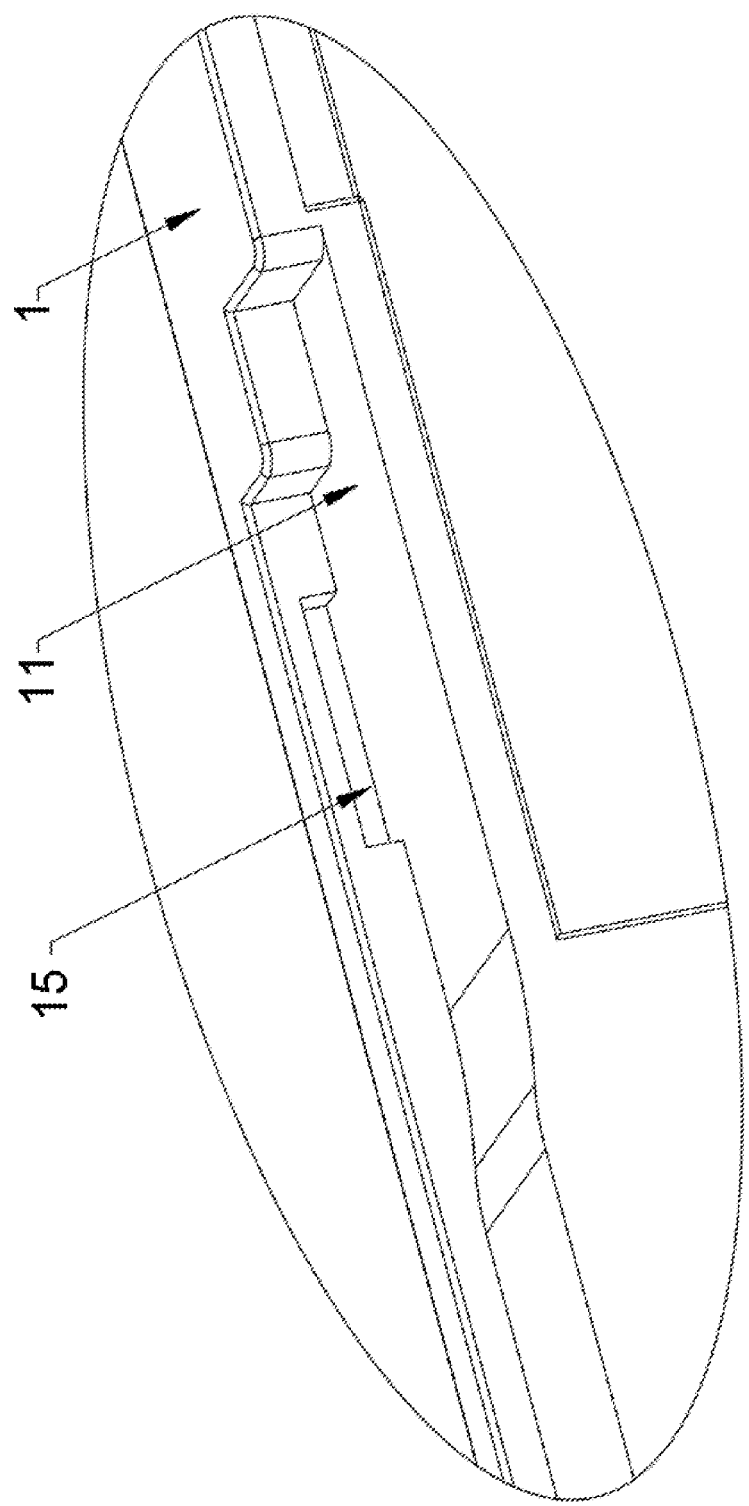
FIG. 6 is a partially enlarged schematic diagram of a spacing groove on a housing according to the present utility model.
Figure 7:
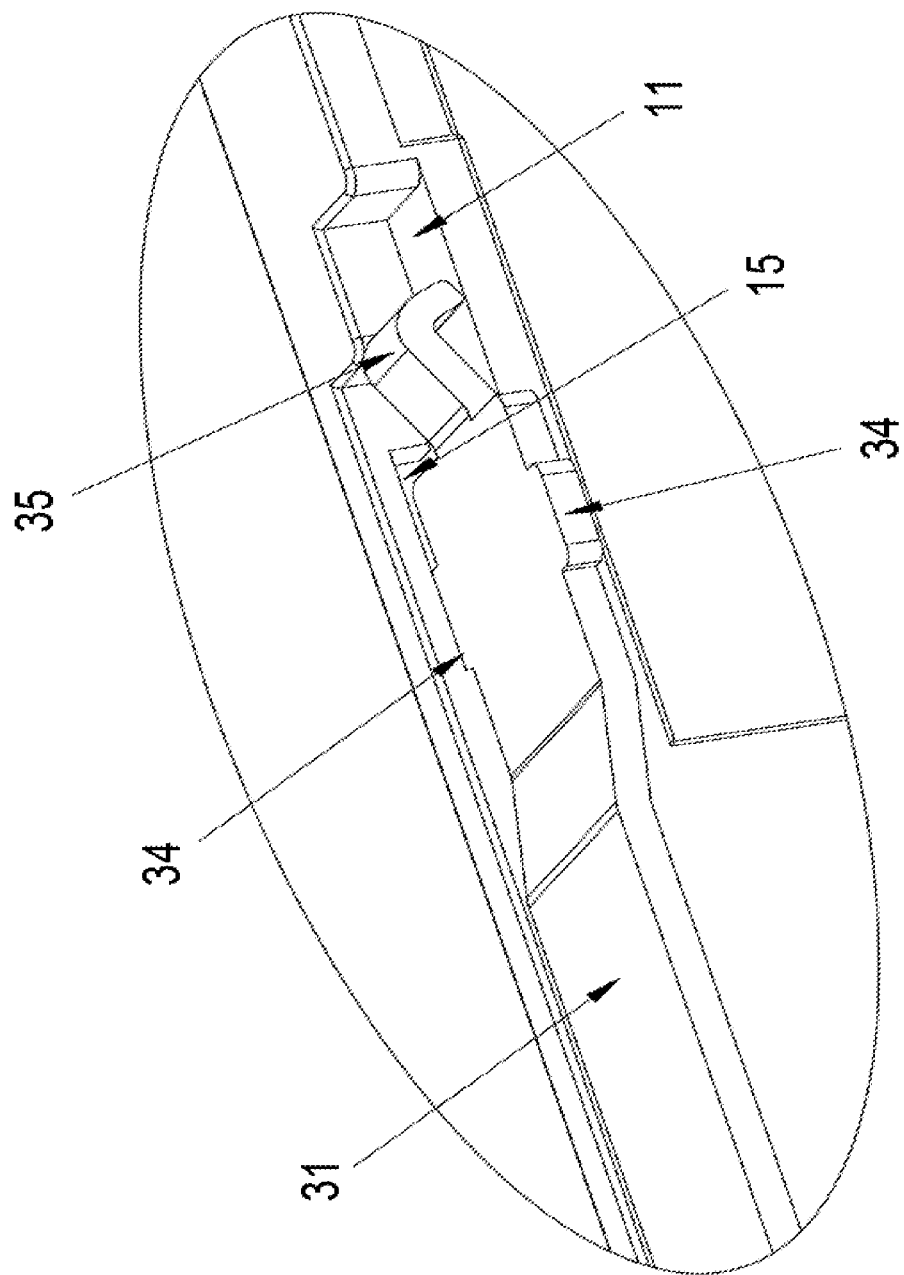
FIG. 7 is a schematic diagram of a position of a spacing projection when a QSFP+ module hot-pluggable unlocking structure is in an unlocked state according to the present utility model.
Figure 8:
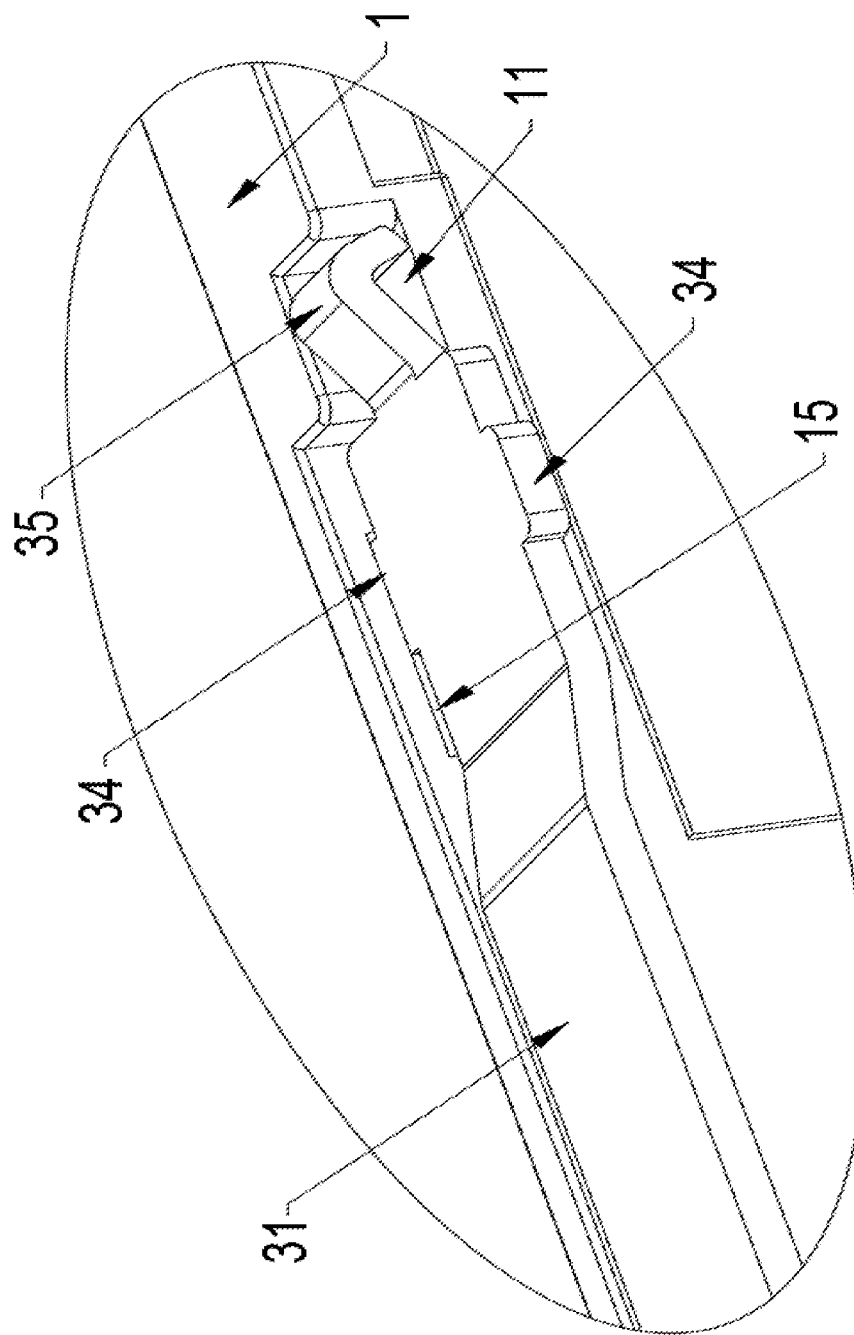
FIG. 8 is a schematic diagram of a position of a spacing projection when a QSFP+ module hot-pluggable unlocking structure is in a locked state according to the present utility model.
Figure 9:
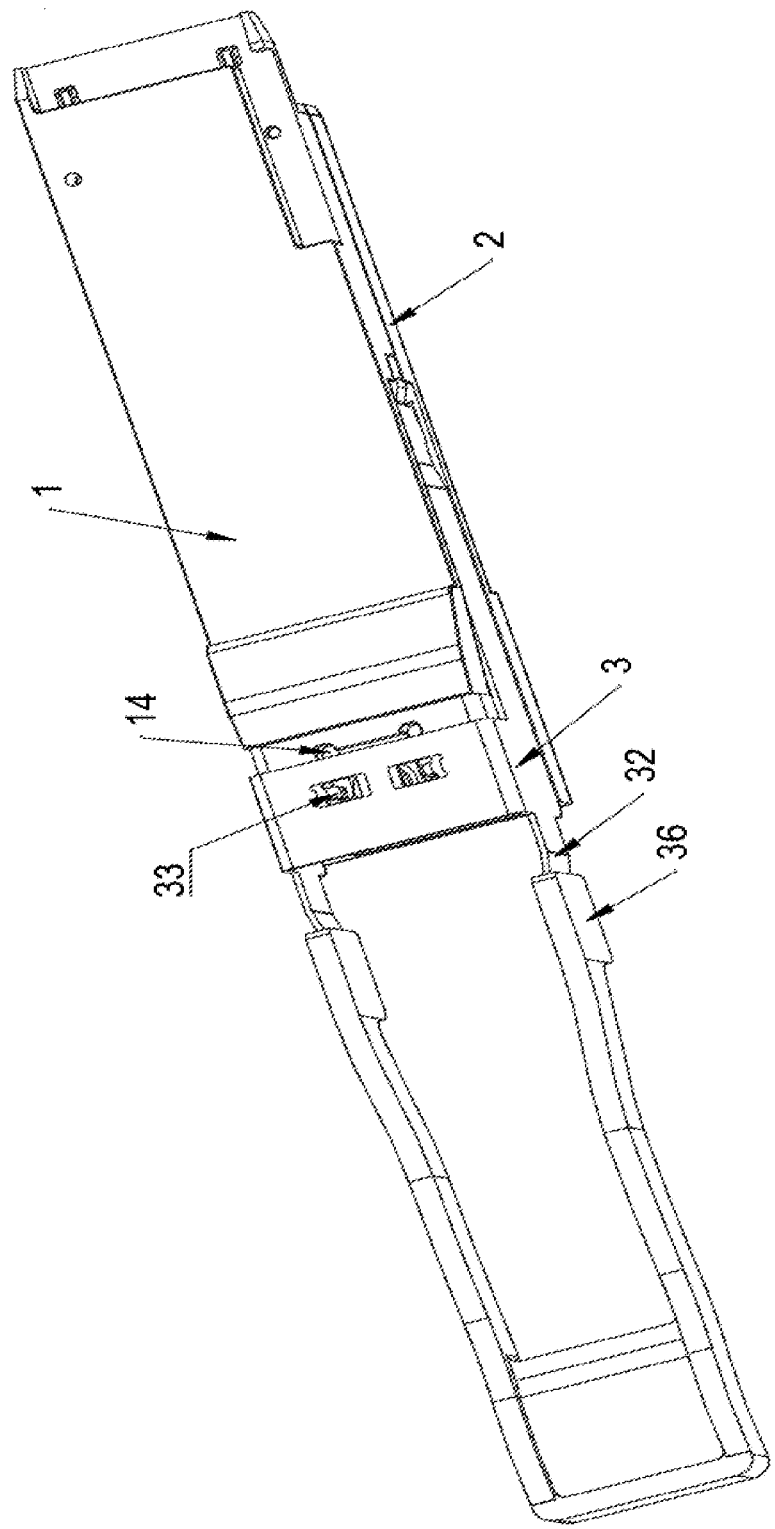
FIG. 9 is a schematic diagram of a position of a locking component when a QSFP+ module hot-pluggable unlocking structure is in an unlocked state according to the present utility model.
Figure 10:
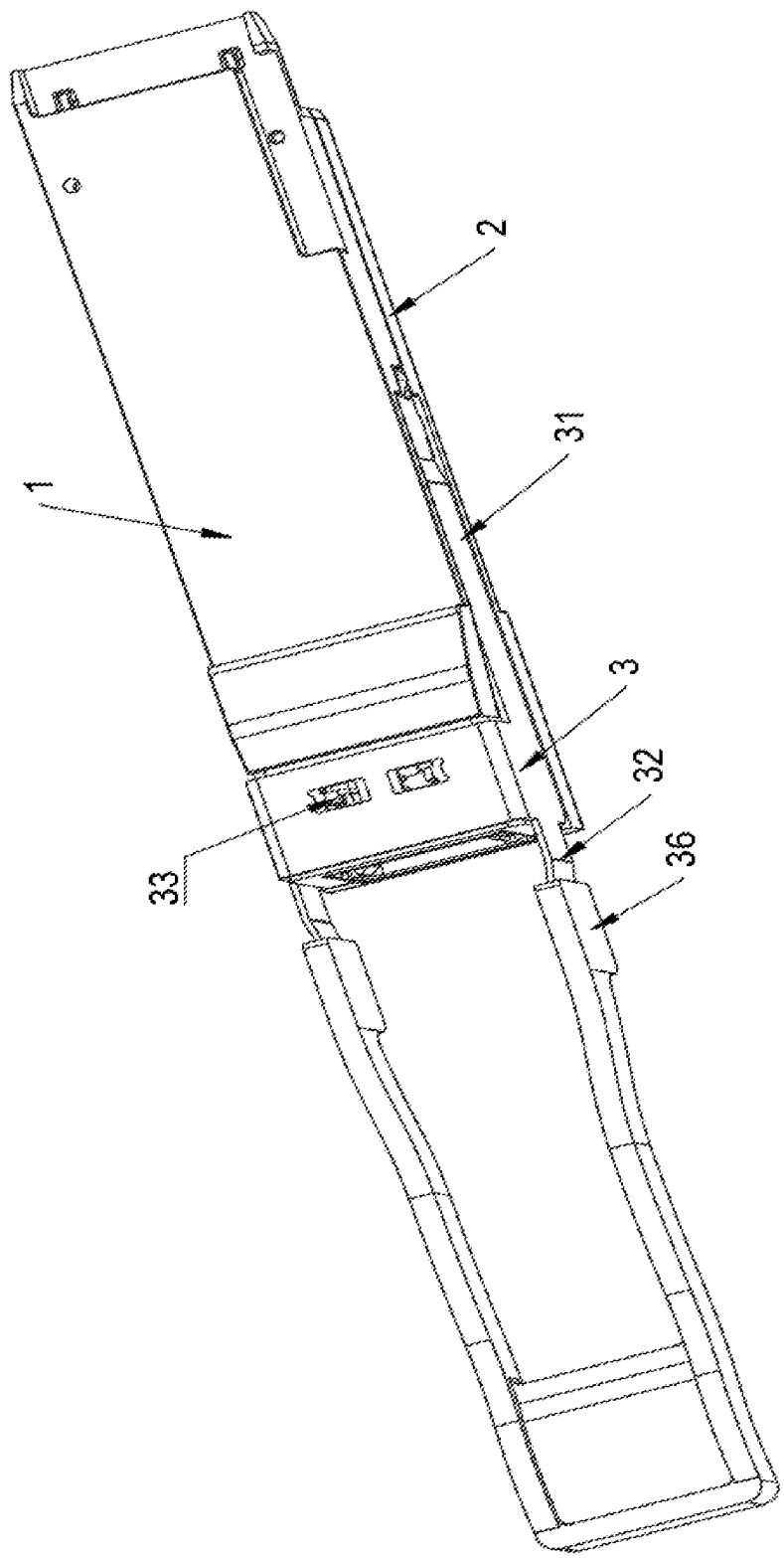
FIG. 10 is a schematic diagram of a position of a locking component when a QSFP+ module hot-pluggable unlocking structure is in a locked state according to the present utility model.
Figure 12:
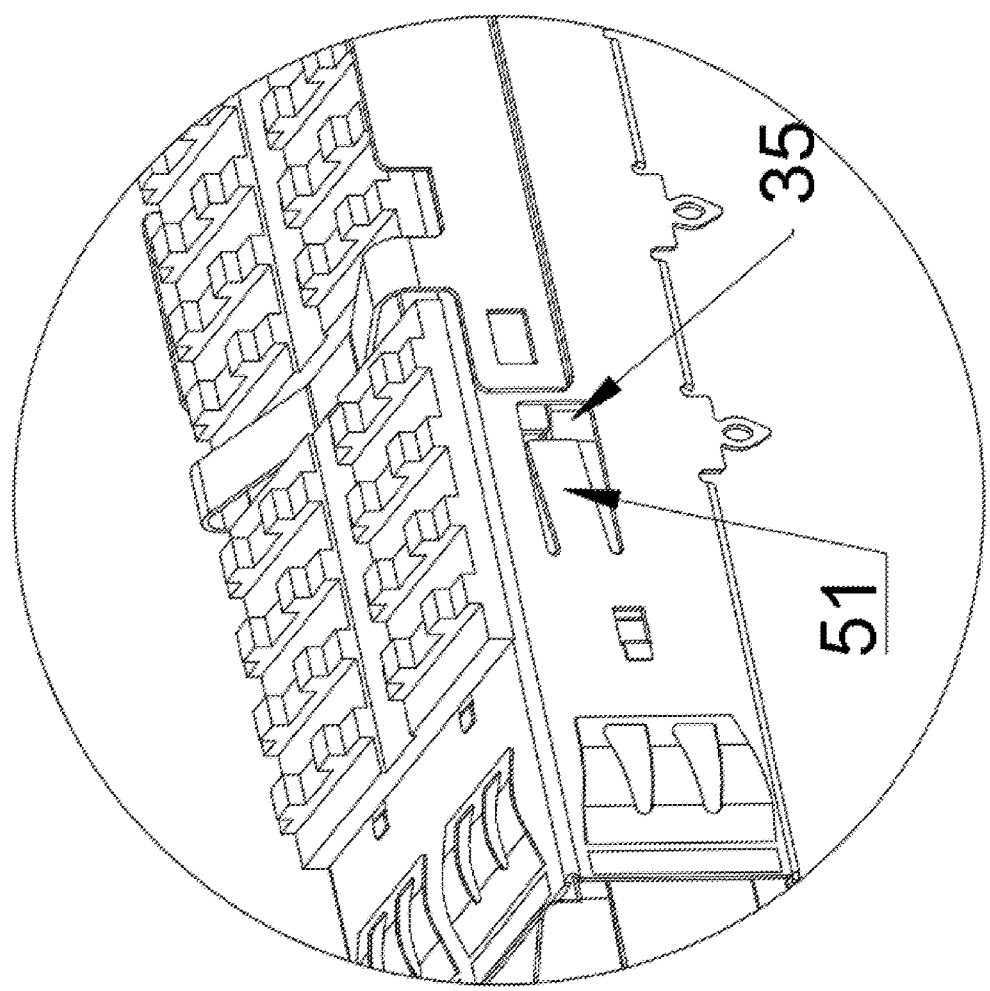
FIG. 12 is a schematic diagram of a position of a spring clip when a QSFP+ module hot-pluggable unlocking structure is in a locked state according to the present utility model.
Figure 13:
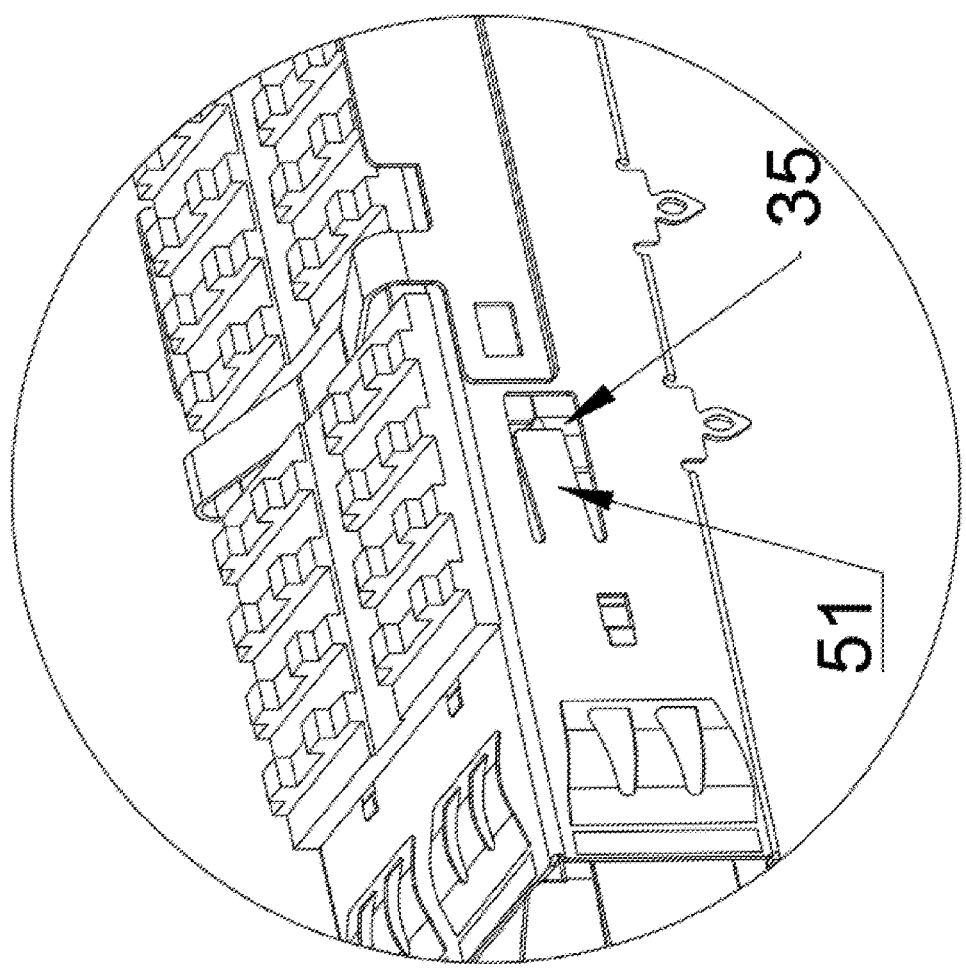
FIG. 13 is a schematic diagram of a position of a spring clip when a QSFP+ module hot-pluggable unlocking structure is in an unlocked state according to the present utility model.

As shown in FIG. 4 to FIG. 13, spring-catch guide 14 are further provided in the spring groove 12, and bottoms of the spring-catch elements 33 are located in the spring-catch guide 14. Specifically, the two legs of the torsion spring are located above the two spring-catch guide 14, respectively, to make the bottoms of the spring-catch elements 33 located in the spring-catch guide 14 (that is, the bottom surfaces of the spring-catch elements 33 are lower than the bottom of the spring groove 12). This can prevent the two legs of the torsion spring from slipping off from the bottoms of the spring-catch elements 33, and improve stability of the hot-pluggable unlocking structure in the present utility model. Further, spacing grooves 15 are further provided on the two sides of the housing, the spacing grooves 15 are connected to the guiding grooves 11, spacing projections 34 are provided on the sides of the unlocking pieces 31, and the spacing projections 34 are engaged with and provided in the spacing grooves 15. Specifically, both the upper cover 1 and the lower cover 2 may be provided with the spacing grooves 15, and both sides of the unlocking pieces 31 may be also provided with the spacing projections 34. The spacing projections 34 may slide horizontally back and forth within the spacing grooves 15 on the upper cover 1 and the lower cover 2, and both an initial locked position and an unlocked position of the spacing projections 34 are limited by the length of the spacing grooves 15. Further, unlocking projections 35 are provided at the ends of the unlocking pieces 31. Specifically, a distance between spring clips 51 on both sides of the cage receptacle 5 is less than a width of the housing, so that the unlocking projections 35 get stuck and the QSFP+ module cannot be removed from the cage. When the pull tab 32 is pulled, the unlocking projections 35 at the ends of the unlocking pieces 31 push up the spring clips 51 of the cage receptacle 5, so as to make the distance between the spring clips 51 on both sides greater than the width of the housing, and then unlock and remove the QSFP+ module.

Figure 14:
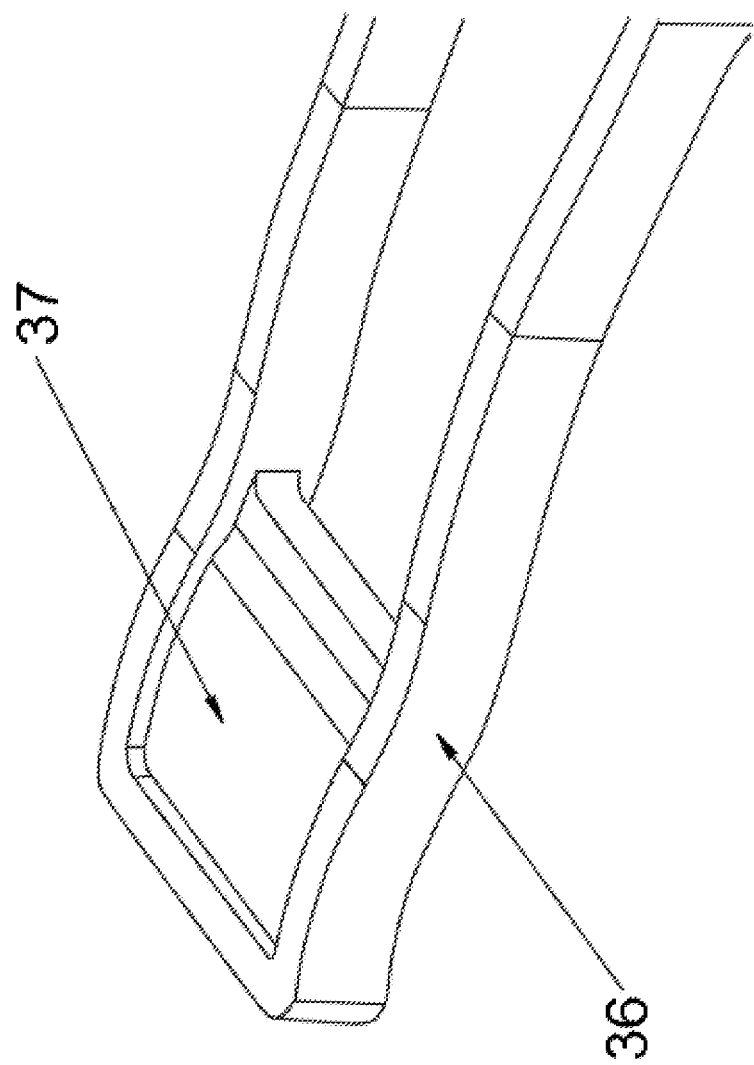
FIG. 14 is a schematic 3D structural diagram of a pull-tab sleeve according to the present utility model.

As shown in FIG. 9 to FIG. 11, and FIG. 14, a pull-tab sleeve 36 is provided around the pull tab 32, the pull tab 32 is enclosed in the pull-tab sleeve 36, and a streamlined curved surface 37 is disposed at the rear end of the pull-tab sleeve 36. Preferably, the pull tab 32 in this embodiment uses a curved tab made of sheet metal, and the pull-tab sleeve 36 is a plastic sleeve. The sheet metal pull tab 32 is sheathed with the pull-tab sleeve 36 by means of one-step thermoplastic processing. To be more user-friendly, the streamlined curved surface 37 at the rear end of the pull-tab sleeve 36 is designed to simulate the bending arc shape of human fingers, facilitating the unlocking operation by using the pull tab 32. The one-step thermoplastic processing of sheathing the sheet metal pull tab 32 with the plastic pull-tab sleeve 36 simplifies assembly of the pull tab 32 and the pull-tab sleeve 36. The component obtained by means of thermoplastic processing has a more stable structure. For long-term use, the plastic around the sealed joint is less prone to aging, oxidation, and fall-off.

It should be understood that the foregoing embodiments are merely intended for describing the technical solutions of the present utility model, but not for limiting the present utility model. Persons of ordinary skill in the art should understand that they may still make modifications to the technical solutions described in the foregoing embodiments or make equivalent replacements to some technical features thereof, without departing from the protection scope of the technical solutions of the embodiments of the present utility model.

What is claimed is:

1. A hot-pluggable unlocking structure of a QSFP+ module, the hot-pluggable unlocking structure comprising a housing formed of an upper cover (1) and a lower cover (2) buckled to each other, and a locking component (3) provided on the housing, wherein guiding grooves (11) are provided on two sides of the housing, two unlocking pieces (31) are provided at one end of the locking component (3) and a pull tab (32) is provided at the other end, the unlocking pieces (31) are engaged with and provided in the guiding grooves (11), a spring (4) is provided on the upper cover (1), spring-catch elements (33) are provided on the locking component (3) and protrude towards the upper cover (1), and the spring-catch elements (33) and the spring (4) are pressed against each other;

wherein the upper cover (1) is provided with a spring groove (12), a middle portion of the spring groove (12) is provided with a positioning pin (13), the spring (4) is a torsion spring with a helical center hole, and the torsion spring is sheathed on the positioning pin (13); the spring groove (12) comprises a wide portion and a narrow portion, two transition steps are formed on both sides at a joint between the wide portion and the narrow portion, and the positioning pin (13) is provided in the wide portion; and two legs of the torsion spring are respectively abutted against the corresponding transition steps, and the torsion spring is in a preloaded state;

each transition step comprises a first surface facing the wide portion and a second surface facing the narrow portion and perpendicular to the first surface; and the two legs of the torsion spring are respectively abutted against the first surfaces of the corresponding transition steps;

wherein both the upper cover (1) and the lower cover (2) are provided with spacing grooves (15), and both sides of the unlocking pieces (31) are provided with spacing projections (34); the spacing projections (34) are capable of sliding horizontally back and forth within the spacing grooves (15) on the upper cover (1) and the lower cover (2), and both an initial locked position and an unlocked position of the spacing projections (34) are limited by a length of the spacing grooves (15); unlocking projections (35) are provided at ends of the unlocking pieces (31); a distance between spring clips (51) on both sides of a cage receptacle (5) in which the hot-pluggable unlocking structure is locked is less than a width of the housing, so that the unlocking projections (35) get stuck and the QSFP+ module cannot be removed from the cage receptacle (5); and when the pull tab (32) is pulled, the unlocking projections (35) push up the spring clips (51) of the cage receptacle (5), so as to make the distance between the spring clips (51) on the both sides greater than the width of the housing, and then unlock and remove the QSFP+ module.

2. The hot-pluggable unlocking structure according to claim 1, wherein spring-catch guides (14) are further provided in the spring groove (12), and bottoms of the spring-catch elements (33) are located in the spring-catch guides (14); the two legs of the torsion spring are respectively located above the corresponding spring-catch guides (14), and bottom surfaces of the spring-catch elements (33) are lower than a bottom of the spring groove (12).

3. The hot-pluggable unlocking structure according to claim 1, wherein a pull-tab sleeve (36) is provided around the pull tab (32), the pull tab (32) is enclosed in the pull-tab sleeve (36), and a streamlined curved surface is disposed at a rear end of the pull-tab sleeve (36); the pull tab (32) uses a curved tab made of sheet metal, and the pull-tab sleeve (36) is a plastic sleeve; and the sheet metal pull tab (32) is sheathed with the pull-tab sleeve (36) by means of one-step thermoplastic processing, the streamlined curved surface is designed to simulate a bending arc shape of human fingers.

* * * * *